United States Patent [19]

Templeton

[11] Patent Number: 4,658,346

[45] Date of Patent: Apr. 14, 1987

[54] APPARATUS FOR CO-GENERATION OF ELECTRIC POWER

[75] Inventor: Frederick E. Templeton, Salt Lake City, Utah

[73] Assignee: Kennecott Corporation, Cleveland, Ohio

[21] Appl. No.: 807,884

[22] Filed: Dec. 11, 1985

[51] Int. Cl.$^4$ .......................................... H02M 5/257
[52] U.S. Cl. .................................. 363/160; 363/164; 323/258
[58] Field of Search .................. 363/34, 37, 43, 160, 363/164, 165; 323/255, 258, 340, 343

[56] References Cited

U.S. PATENT DOCUMENTS

| | | | |
|---|---|---|---|
| 3,319,147 | 5/1967 | Mapham | 363/160 X |
| 3,431,483 | 3/1969 | LaFuze | 321/7 |
| 3,493,838 | 2/1970 | Gyugyi et al. | 363/160 X |
| 3,707,665 | 12/1972 | Gyugyi | 321/5 |
| 3,832,625 | 4/1974 | Gyugyi | 322/47 |
| 3,896,365 | 7/1975 | Corry | 363/34 X |
| 3,921,059 | 11/1975 | Birman et al. | 323/258 X |
| 4,164,785 | 8/1979 | Young et al. | 363/37 X |
| 4,240,135 | 12/1980 | Schaefer, III | 323/258 X |
| 4,415,848 | 11/1983 | Morishita | 322/32 |
| 4,419,618 | 12/1983 | Gretsch | 322/7 |

OTHER PUBLICATIONS

Gyugyi et al., Static Power Frequency Changers, 1976, pp. 21-24; 33-50; and 383-395.

Primary Examiner—Patrick R. Salce
Assistant Examiner—Marc S. Hoff
Attorney, Agent, or Firm—Jeffrey A. Wyand; Gary R. Plotecher; Larry W. Evans

[57] ABSTRACT

Apparatus for converting relatively high, variable frequency, variable amplitude electrical power into substantially constant amplitude and substantially constant, relatively lower frequency power of a preselected waveform. The power source signal is divided into a number of varying amplitude, same frequency segments. The segment having the amplitude nearest that of the preselected waveform is transmitted by a switching network during each of many time periods. The switching network is preferably controlled by a microprocessor that senses the amplitudes of the segments and compares them to the desired waveform amplitude as a function of time. The microprocessor provides control signals to the switching network in response to the comparison. Because the low frequency output signal is constructed with reference to a memorized signal, the output signal is particularly stable in spite of variations in the power source signal.

The power source may be a mechanical electrical generator driven by a high speed machine, such as a turbine, producing excess usable power. The generated electricity may be divided into segments by means of a number of taps on a winding of the generator or by a transformer having a multiply tapped secondary winding. By use of the invention, usable electrical power may be co-generated from an energy source conserving otherwise wasted energy.

34 Claims, 13 Drawing Figures

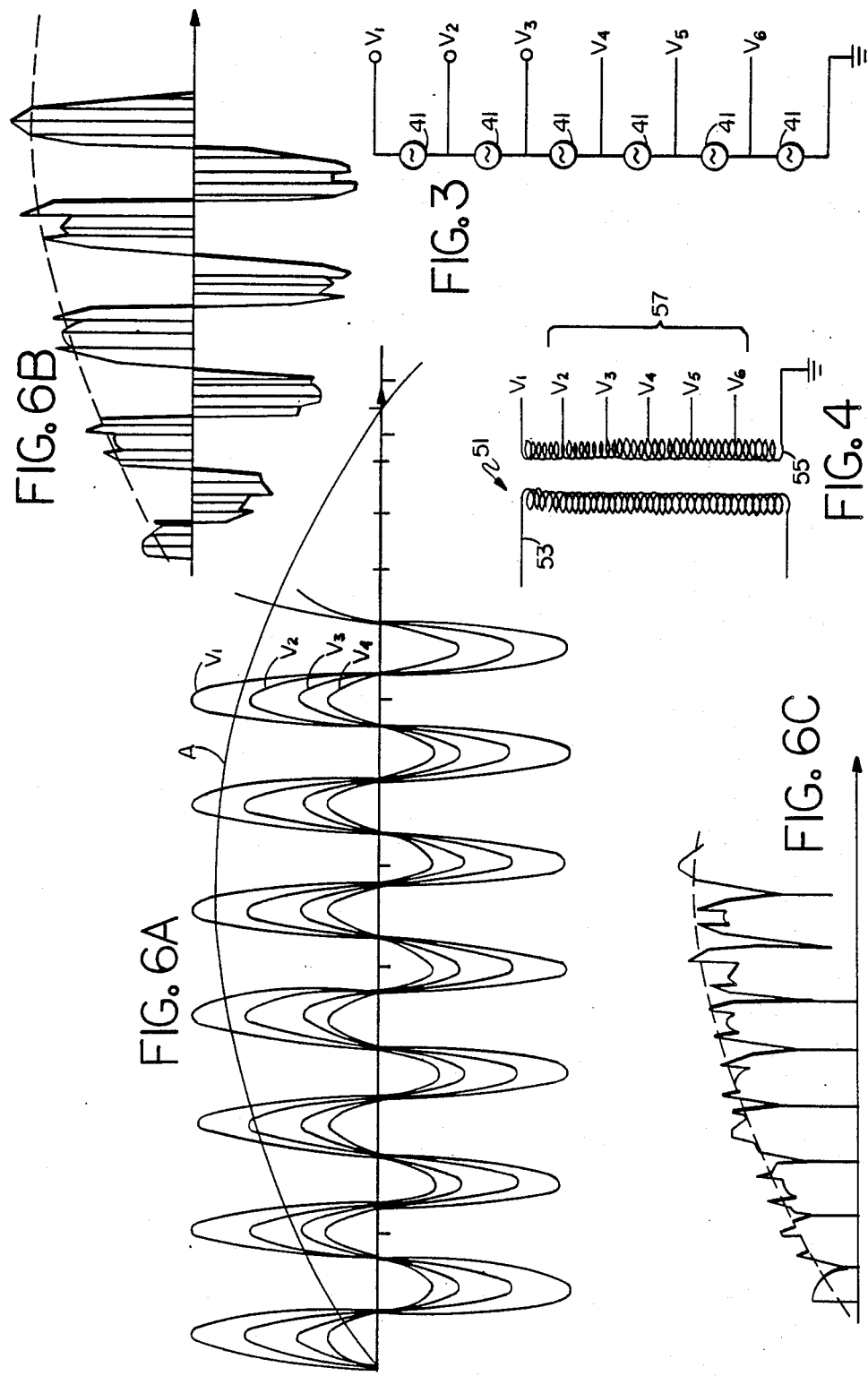

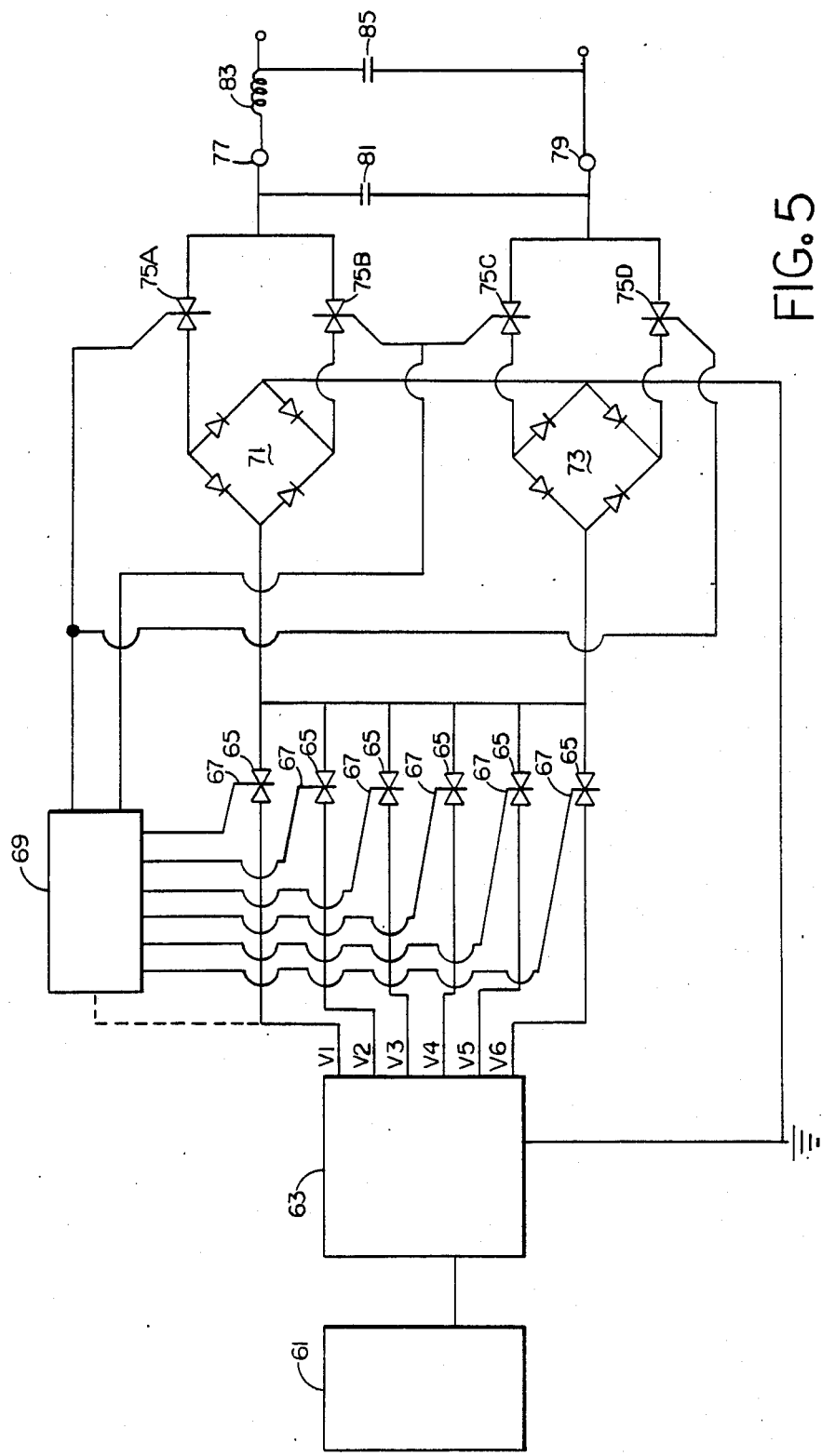

APPARATUS FOR CO-GENERATION OF ELECTRIC POWER

BACKGROUND

Many mechanical power generators, such as turbines, are used in various applications to supply power in various forms for various needs. For example, aircraft engines use turbines to drive the aircraft. Typically, the shaft rotational speeds in these mechanical generators are relatively high, with turbine shafts often reaching speeds of tens of thousands of revolutions per minute. In many of these applications, unconsumed mechanical power is available and it is desirable to produce electricity from this available power. However, the high shaft rotational speeds of these mechanical generators are unacceptable for conventional alternating current power generation. In conventional electrical generators, the frequency of the electricity generated is directly related to shaft speed. If electrical power were generated from these high shaft speeds, it would be of an impractically high frequency for powering conventional electrical and electronic equipment. In addition, the shaft speeds of turbines and other mechanical power generators usually vary depending upon the load and other operating conditions. These variations in shaft speed alter the frequency and amplitude of the electrical power produced by a generator mounted on the same shaft, making the generated electricity even more unacceptable for powering conventional equipment that requires electrical power of substantially constant frequency and amplitude.

The proposed solutions to extraction, i.e. co-generation, of alternating current electrical power from high, variable speed mechanical generators have not been successful. Constant-speed mechanical gearing inserted between a variable speed shaft and an electrical generator is expensive, complex, heavy and susceptible to constant maintenance and frequent replacement. For high speed turbines, mechanical gearing is particularly impractical.

Various electromechanical apparatus for reducing the frequency of electrical power, generally termed "cycloconverters", has been proposed. Examples are described in U.S. Pat. Nos. 3,431,483 to LaFuze and 3,707,665, 3,832,625, both to Gyugyi. These cycloconverters draw electric power from the various phase windings of a polyphase generator through controlled switches connected to each phase. The phases are switched under the influence of control circuitry that frequently involves complex regulators or a constant frequency generator. The different generator phases are switched "on" and "off" at different times and the various "time slices" of power transmitted during the "on" times of the switches are combined and sometimes filtered to produce electrical power at a preselected frequency. It is notable that these cycloconverters all employ polyphase electrical generators in order to produce single phase output power. Preferably the polyphase generators driving the cycloconverters employ at least six phases to produce a smooth, lower frequency output. In the cycloconverters, whenever a generator phase is switched "on", current is drawn through the entire generator winding of that phase.

Cycloconverters intended for use in motor vehicles are described in U.S. Pat. Nos. 4,415,848 to Morishita and 4,419,618 to Gretsch. Each of these cycloconverters converts three phase power to lower frequency single phase power. The patent to Morishita describes a feedback circuit for adjusting the amplitude of the induction field in the generator to control the amplitude of the single phase output signal. A constant frequency generator is used to control the switches, meaning that changes in shaft speed will alter the output waveform in amplitude in a complex, non-controlled manner. The patent to Gretsch departs from the other cycloconverters by controllably selecting taps on transformer windings rather than switching the phases of the generator "on" and "off". The phases of the generated power are selectively connected to the various transformer taps by controllable switches to match the impedance of the generator to that of the load. The matching maximizes energy transfer and minimizes the size of generator needed for a particular installation. As in the Morishita patent, a voltage regulator is used to control the current in the field winding of the generator to control the amplitude of the lower frequency output power.

SUMMARY OF THE INVENTION

In preferred embodiments of the invention, relatively high and variable frequency single phase power is converted into single phase power having a desired waveform of substantially constant amplitude and substantially constant, relatively low, frequency. The necessity of a polyphase generator, the relatively high copper losses and use of relatively heavy circuit components described in known cycloconverters are eliminated by the invention. It is not necessary in the invention that either the input or output signals be sinusoidal, increasing the flexibility of the inventive apparatus over that of conventional cycloconverters. In the invention, alternating current electrical power of relatively high frequency may be generated by a rotating machine, preferably directly driven by a turbine or other high shaft speed source. The electrical generator is preferably an induction generator having a permanent magnet mounted on its rotor to produce a magnetic field for inducing a current in a winding mounted on the stator. Alternatively, the windings and permanent magnets or electromagnets may be mounted on the stator and the rotor may contain alternating zones of magnetic and non-magnetic materials to vary the magnetic flux crossing the windings on the stator.

The generated electrical power is divided into a number of different segments each similar to the generated power signal, but all having different amplitudes. In one embodiment, the division is accomplished by a number of taps connected to the stator winding. In another embodiment, the power from a source, that need not be a rotating generator, is divided into segments by a transformer having multiple taps on its secondary winding. Each signal segment passes to a controllable switch, preferably a bilateral gated switch, where different segments may be transmitted or not, depending on the state of the switches. The switches are controlled so that the different segments are transmitted during different times to replicate the amplitude of the desired, lower frequency signal that may be advantageously used to drive conventional electrical equipment.

In one embodiment of the invention, the selectively transmitted signals are first rectified and then, preferably, filtered to provide the desired frequency waveform. In another embodiment, the rectification stage is omitted and the lower frequency current is subjected to filtering, preferably more thorough than in the embodiment just described, to produce the desired waveform. In either of these embodiments, the polarity of the output signal of desired waveform is established by a polarity circuit, for example, ensuring that alternating positive and negative half cycles of electrical power are produced. In a preferred embodiment, the polarity circuit includes controllable switches that are opened and closed in synchronism with the zero-crossing points of the lower frequency output power signal. By sensing the zero-crossing points of a reference signal and adjusting the timing of the zero-crossing points of the desired output signal, a preselected phase relationship may be maintained between the reference and output signals. A fixed phase relationship can be important in delivering power to a power grid and other applications of the invention.

The selective transmission of the input signal segments over time may be controlled by numerous means. In one embodiment, the desired output signal waveform is stored in a microprocessor which samples the signal segments, compares the desired waveform and segment amplitudes at various times and generates control signals to transmit over time the segments having amplitudes nearest the amplitudes of the desired signal. Changes in frequency and amplitude of the input signal therefore have little effect on the same characteristics of the output signal since the stored waveform is replicated independent of input signal characteristics. The amplitude of the output power signal may also be regulated in another embodiment by providing a feedback control to adjust the current flowing through a field winding in the generator.

The apparatus may accept a single phase, high frequency input signal and produce the desired lower frequency, single phase output power. Since only the transmitted input signal segments represent current flowing through one part of the signal divider at any given instant, rather than current flowing through an entire phase coil of a polyphase generator, resistive power losses are reduced. The apparatus avoids the necessity of heavy filtering apparatus by generating a relatively accurate replica of the desired low frequency power output, an important consideration in airborne and missile applications. Polyphase output signals may be generated from both single phase and polyphase sources.

The preferred embodiments of the invention can be better understood with reference to the following drawings.

BRIEF DESCRIPTION OF DRAWINGS

FIG. 3 is an equivalent circuit of a portion of a preferred embodiment of the invention.

FIG. 4 is a schematic diagram of a transformer according to a preferred embodiment of the invention.

FIG. 5 is a schematic diagram of a preferred embodiment of the invention.

FIG. 6A is a graph of amplitude versus time of input signal segments and of a desired output signal; FIG. 6B is a graph of amplitude versus time of transmitted segments of an input signal and of a desired output signal; and FIG. 6C is a graph of amplitude versus time of rectified transmitted segments of an input signal and of a desired output signal.

DETAILED DESCRIPTION OF PREFERRED EMBODIMENTS

Figure 1:
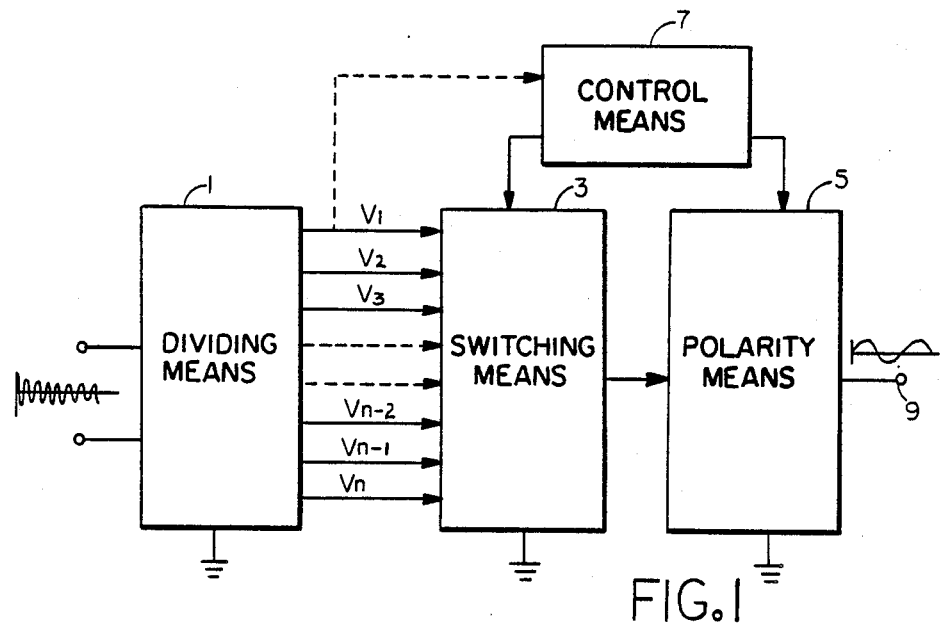
FIG. 1 is a block diagram of a preferred embodiment of the invention.

A block diagram of a preferred embodiment of the invention is shown in FIG. 1. A relatively high frequency input signal, shown schematically on a time axis, is applied to a dividing means 1. The frequency of the input signal may be variable and the signal need not be sinusoidal or even have different amplitude polarities. Commonly the input signal may be generated by a rotating machine, such as an induction type generator, driven by a turbine or other prime mover, that produces a sinusoidal signal. Since most electrical and electronic equipment is intended to be powered by a sixty Hertz sinusoidal signal, the invention is particularly described with reference to sinsoidal input and output signals. However, the invention is not limited to use with such signals.

Dividing means 1 divides the input signal into a number of segments, $V_1, V_2, V_3, \ldots V_{n-2}, V_{n-1}, V_n$, substantially similar to the input waveform, except that the amplitudes of the segments are different from each other. That is, for the diagram of FIG. 1, $V_1 > V_2 > V_3 \ldots > V_{n-2} V_{n-1} V_n$. These signal segments are applied to a switching means 3 that selectively transmits one of the signal segments at a time to a polarity means 5. A control means 7, which may sample one or more of signals $V_1$ through $V_n$ as indicated by the broken line, controls switching means 3 and determines which of the signal segments is selectively transmitted to polarity means 5. Polarity means 5 is also under the influence of control means 7 and determines the polarity of the signal segment that appears at an output terminal 9. As indicated by the time graph drawn adjacent terminal 9, the output signal is an alternating current signal having a preselected, substantially uniform frequency and amplitude. The output signal frequency is much lower than that of the input signal, preferably at least ten times lower and most preferably at least thirty times lower.

Control means 7 effectively slices time into units that are relatively small compared to the period of the input signal. During each time unit, control means 7 directs switching means 3 to transmit one of the input signal segments. A segment may remain "on" for more than one consecutive time unit, or the selectively transmitted signal segment may change from one time unit to the next.

Control means 7 may simply direct switching means 3 to follow a preselected pattern over time where the relationship between the input and output waveforms is stable, i.e. where the input and output waveforms have a fixed relationship of frequency and phase over time. Or, control means 7 may compare the amplitudes of the signal segments to a reference signal waveform having the desired output signal frequency and amplitude and direct switching means 3 to transmit the segment most closely matching the amplitude of the output waveform during each time unit.

Polarity means 5 is driven by control means 7 so that the signal at output terminal 9 is zero at each zero-crossing point of the desired output signal. In addition, polarity means makes certain, when desired, that each half cycle of the output signal has a polarity opposite that of its predecessor.

There are numerous possible embodiments of dividing means 1. The dividing means may be an integral part of an alternating current generator, such as the one, 19, shown in cross section in FIG. 2. There, a central shaft 21 has a rotor 23 that nay be rotated with respect to a stator 27. Rotor 23 contains at its periphery four permanent magnet, magnetic poles 25, that are uniformly spaced from each other and separated by non-magnetic spacers 26. Stator 27 includes four interconnected coils 29 that are wound in four poles by conventional means. Generator 19 is an entirely conventional alternating current, induction, single phase generator, with the exceptions described below. Generator 19 is illustrative of, but not the only sort of, an alternating current generator suitable for use in the invention. For example, a generator may have fewer or more poles and may be polyphase. But it is preferred in a turbine driven generator, that the magnetic induction field be created by a permanent magnet mounted on the shaft 21. The use of a permanent magnet avoids the necessity of sliding contacts, slip rings and the like. Moreover, the strength of the magnetic field may be relatively high using neodymium-iron-boron magnets recently developed by General Electric Co. or other lightweight, strong magnets. These materials permit the construction of a rugged, small, relatively lightweight, yet powerful generator that can withstand turbine shaft speeds that may reach several tens of thousands of revolutions per minute. I estimate that with magnets now available, a generator 30 cm. in diameter and 30 cm. long could produce 150 kilowatts of power.

Figure 2:
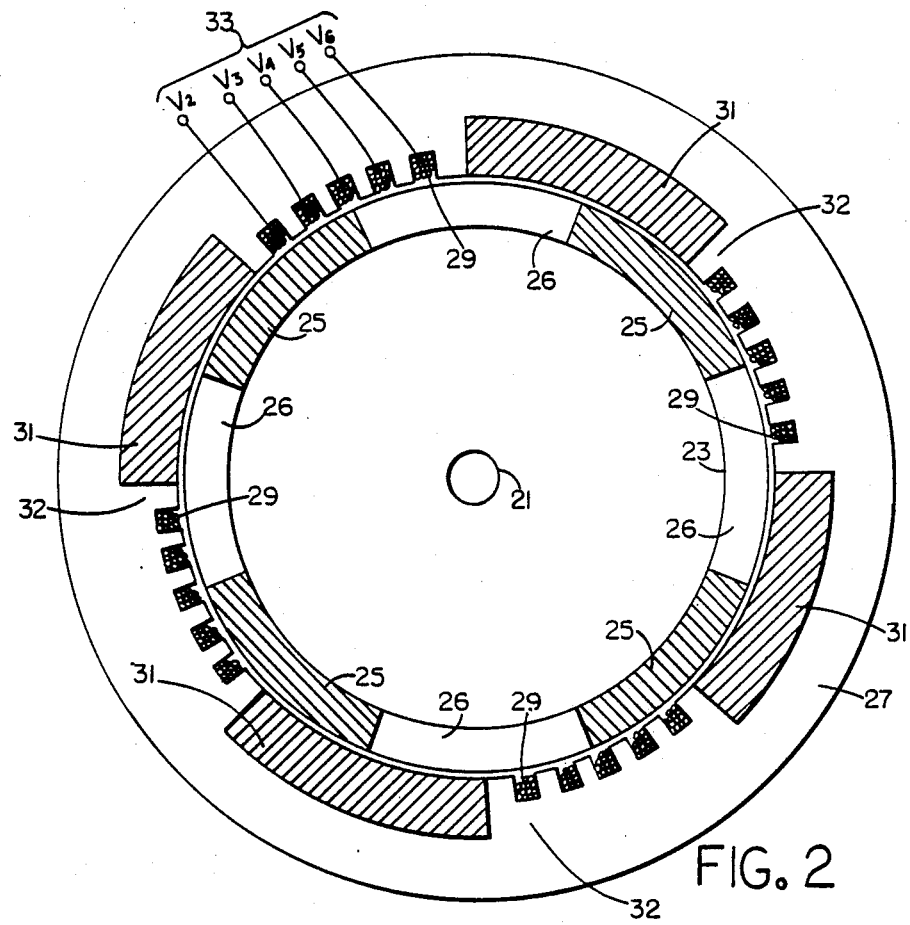
FIG. 2 is a cross-sectional view of a generator according to a Preferred embodiment of the invention.

Generator 19 unconventionally includes a number of taps or electrical connections 33, illustrated schematically in FIG. 2, that are added to winding 29. Winding 29, effectively. is a long strand of wire or other conductor that is wrapped on the stator form. Current is induced in winding 29 by the changes in magnetic flux associated with the rotor motion. (An alternative embodiment includes four magnets 31, permanent or electromagnetic, that are disposed on the inside margin of stator 27, separated by non-magnetic regions 32. The relative motion of magnets 25 and 31 when rotor 23 spins, induces a current in winding 29.) Each tap 33 is a connection to winding 29 intermediate its ends. One end of winding 29 produces the full amplitude of the signal induced in the winding. The other end of the winding acts as a common terminal. Taps 33 intermediate the ends of winding 29 give access to signals intermediate in amplitude to those at the end terminals. In other words, the input signal segments that are available at the taps force the stator coil to behave as a signal divider. FIG. 3 shows an equivalent circuit for generator 19 producing signal segments of the type employed in the apparatus of FIG. 1. A number of alternating current, same frequency, but not necessarily same amplitude, sources 41 are connected in series and the signal segments are extracted from the ends of the series string and from each junction between generators. For simplicity, four taps plus the ends of winding 29 are shown as connections, although a greater or lesser number may be employed, with ten taps being an example of a number that might be typically used in the invention.

Another means of producing a multiple number of alternating current signals having differing amplitudes is illustrated in FIG. 4. A conventional transformer 51 includes a primary winding 53 and a secondary winding 55 having a number of taps 57 intermediate its ends. The same sort of set of signal segments can be extracted from taps 57 on secondary winding 55 as from taps 33 on generator 19. The peak amplitude of the signal at the transformer secondary can exceed, be the same as, or less than the peak amplitude of the input signal, depending upon the turns ratio of the transformer. This optional step-up or step-down feature is not available with generator 19. The input signal supplied to primary winding 53 of transformer 51 need not come from a rotating machine. Any alternating current power source may be applied to the input terminals of transformer 51.

A more detailed schematic circuit diagram of a preferred embodiment of the invention is shown in FIG. 5. For purposes of illustration, a high speed turbine 61 drives an alternator 63, like generator 19, that produces six different amplitudes of the input signal, i.e. signal segments $V_1$ throu $V_6$. Switching means 3 from FIG. 1 includes a separate gate-controlled, bilateral switch 65 connected to each of signal segments $V_1$ through $V_6$. Such switches are known as triacs and are conventionally available. Triacs conduct current in both directions so long as the appropriate gate signal is present at the gate electrode. In the absence of the proper gate signal, the triac is open or off, i.e. does not conduct current. Gate electrodes 67 of switches 65 are all connected to a control means 69. Control means 69 may also sample one of the signal segments, such as segment $V_1$, as indicated by the dashed line in FIG. 5. Control means 69 produces gate signals so that switches 65 selectively transmit one of the signal segments at a time.

The outputs of bilateral switches 65 are all connected to one of the input terminals of both of two separate full wave rectifying circuits 71 and 73. The other input terminals of rectifying bridges 71 and 73 are connected to the common terminal of alternator 63. Since switches 65 conduct current in both directions, an alternating current signal having the frequency of the input signal is applied to rectifying circuits 71 and 73 when a signal segment is being transmitted by a switch 65. Each bridge produces the same rectified signal by full-wave rectifying the transmitted signal segment. In order to produce the desired polarity and frequency of output signal, assuming a sinusoidal output signal is desired, it is necessary to alternate the polarity of the rectified signal for successive half cycles of the preselected output signal waveform.

Polarity means 5 from FIG. 1 controlling the output signal polarity includes bilateral gate-controlled switches 75A, 75B, 75C and 75D, one of which is connected to each of the output terminals of each bridge 71 and 73. The two switches from each bridge, i.e. 75A, 75B and 75C, 75D, are connected together to form output terminals 77 and 79, respectively, of the apparatus. The gate electrodes of switches 75A-75D are connected to control means 69. The gate electrodes from the opposite terminals of each bridge, i.e. switches 75A, 75D and 75B, 75C, are connected together. Control means 69 is constructed so that the states of switch pairs 75A, 75D and 75B, 75C are mutually exclusive. That is, only one pair of the switches is in the "on" or conducting state at a time and the one pair is always in the opposite or "off" state.

It is preferred that the output signal be electrically filtered to remove undesired frequency components and smooth the waveform. As an example of such a filter, a pi filter is connected across the output terminals of the apparatus. A capacitor 81 is connected between terminals 77 and 79, a series inductor 83 is connected to terminal 77 and a parallel capacitor 85 is connected from the output terminal of inductor 83 to terminal 79 to suppress unwanted frequency components in the output signal waveform. Filter circuits are well known and various other filters could be used to smooth the output waveform.

The operation of the circuitry of FIG. 5 is more easily understood by reference to FIG. 6. In FIG. 6A, the amplitudes of a number of alternating current signals is plotted versus time. Four signal segments $V_1$, $V_2$, $V_3$ and $V_4$ are plotted over several cycles. These segments represent the differing amplitude signals, in this illustration from a sinusoidal source, that are produced by dividing means 3 of FIG. 1, such as the generator of FIG. 2 or the transformer of FIG. 4. Only four such segments are shown for clarity. Approximately one half cycle of a sinusoidal, lower frequency preselected waveform output signal is shown as line A in FIG. 6A.

Signals $V_1$ through $V_4$ are applied to the switching means, such as switches 65. By means explained below, control means 69 determines which of signals $V_1$ through $V_4$ has an amplitude at any given time that best replicates the desired output signal amplitude. This decision is made periodically during different time units that are preferably much shorter than the period of the input signal. It is preferred that control means 69 activate only one of switches 65 at a time although more than one switch could be closed so long as no signal having greater than the selected amplitude is connected during a particular time unit.

An example of the product of the opening and closing of switches 65 is plotted in FIG. 6B. There, the amplitude of the signal that appears at the common output terminals of switches 65 is plotted for about one quarter cycle of the desired output signal. The plotted signal has both positive and negative amplitude components since switches 65 are bilateral. As indicated by the vertical lines, switching means 69 selects the signal segment for transmission during each time unit that has the amplitude closest to that of the desired, preselected output waveform. In some instances, the same signal segment is transmitted over several consecutive time units. These segments are applied to rectifers 71 and 73 and are rectified to form a signal like that shown in FIG. 6C for approximately one quarter of a cycle of the output signal. As indicated in FIG. 6C, this output signal would continue over time with only positive amplitudes if the signal polarity were not perodically reversed. This reversal is accomplished by switches 75A–75D. During the first half cycle, for example, a positive amplitude signal is applied to switches 75B and 75C while negative amplitude signals are applied to switches 75A and 75D. Switches 75B and 75C are enabled by applying appropriate gate signals to them so that a positive amplitude signal appears at output terminal 77. At the end of the half cycle of the output signal, the states of switches 75A through 75D is reversed, so that a negative polarity signal appears at terminal 77 for one half cycle. The process repeats continuously. The filtering means following the polarity circuit smoothes the waveform of FIG. 6C, tending to cut off the overshoots and fill in the undershoots from the desired signal.

Figure 7:
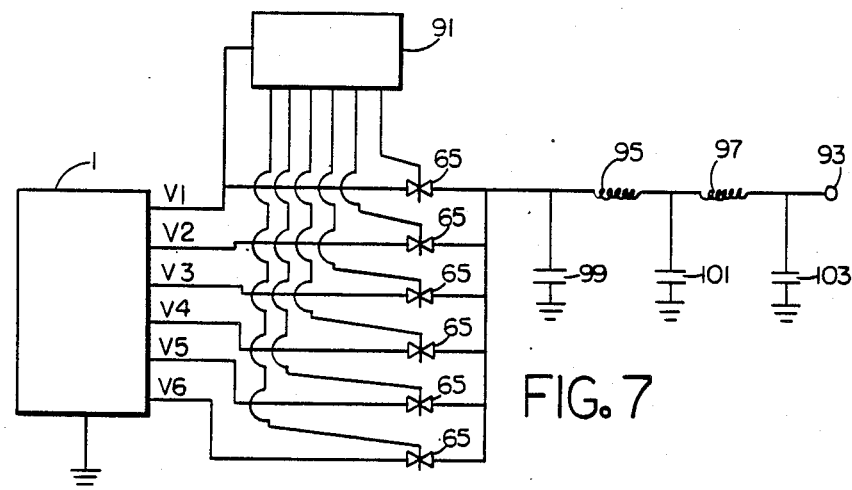
FIG. 7 is a schematic diagram of another preferred embodiment of the invention.

In FIG. 7, a simpler, though in some applications less efficient, embodiment of the invention is depicted in schematic form. Similar elements are given the same reference numerals used in other figures. This embodiment is the same through switching means 3 as those already described. However, the control means 91 is changed from control means 69. Then the input signal is sinusoidal or of another waveform having positive and negative amplitudes, the selectively transmitted segments, according to previous descriptions, will have both positive and negative amplitude components. In this embodiment, control means 91 senses the amplitude polarity of the signal segments, such as $V_1$, and, assuming a sinusoidal output signal, during each half cycle of the output signal enables one switch 65 of switching means 3 only when the segments have one preselected amplitude, i.e. negative or positive. Control means 91 alternates at each half cycle of the output signal, choosing only the opposite polarity amplitude signal segments, compared to those of the previous half cycle, for selective transmission. By including this polarity capability in the control means, making polarity means 5 a part of control means 91, the rectification means may be eliminated. Of course, in this embodiment the transmitted waveform is less smooth then with the embodiment of FIG. 5 and so it may be desirable to increase the amount of filtering of the output signal.

As shown in FIG. 7, the output terminals of switches 65 are connected commonly to a filter that is connected to an output terminal 93 of the apparatus. The filtering means embodiment shown is a double stage pi type including two series inductors 95 and 97 between switches 65 and output terminal 93 with one of capacitors 99, 101 and 103 connected, respectively, to the input side of inductor 95, to the junction of inductors 95 and 97 and to terminal 93. Other filters may also be used and may be more complex or simpler depending upon considerations of cost, weight of the apparatus and the purity of the output signal required for a particular application.

While the detailed description here focuses on sinusoidal waveforms, since they are easily generated with known technology and electrical equipment is usually designed to be powered by sinusoidal waveforms, the invention is not limited to use of such waveforms. In fact, virtually any input waveform can be used, so long as its frequency is much higher than the desired output waveform. If the input waveform has a single amplitude polarity, such as a pulse train, embodiments of the apparatus can be simplified. For example, no rectifying means may be needed and, if the preselected output signal waveform is of only one amplitude polarity, no polarity means may be required. In addition, the detailed description is directed to single phase sources supplying single phase output waveforms, in contrast to the known cycloconverters that require polyphase input signals to produce single phase output signals. The present invention can be used to produce polyphase output signals from single phase polyphase sources. For example, with a three phase source, three of embodiments of FIGS. 1, 5 or 7 might be used, one such embodiment for each phase. The control means in the circuits for each of the phases should be in communication in this application in order to maintain the desired phase separation between each of the lower frequency output signal phases. Likewise, a single phase source supplied to each of three embodiments of FIGS. 1, 5 or 7 could be used to supply a three phase output signal if their respective control means were interconnected to maintain the desired phase relation between the separate output signals.

Figure 8:
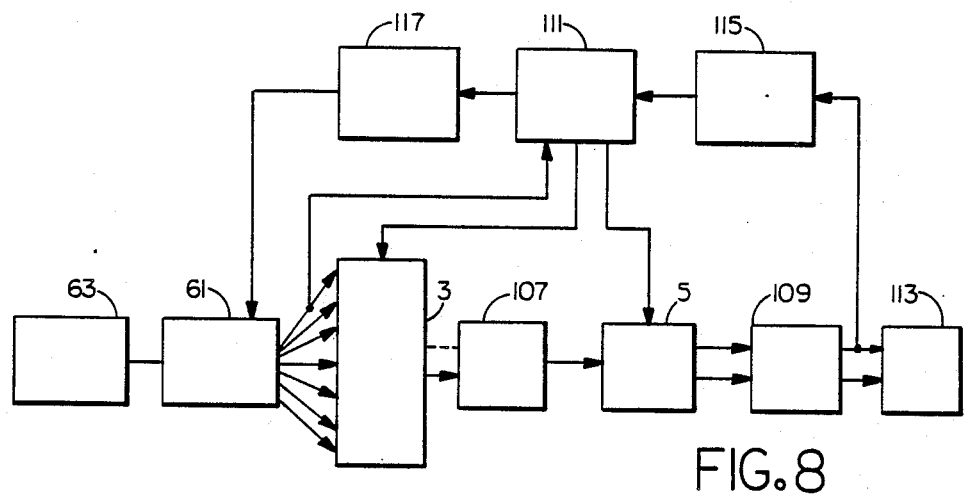
FIG. 8 is a block diagram of yet another preferred embodimenl of the invention.

A generalized embodiment of the invention is shown in block diagram form in FIG. 8. Like elements from embodiments already described are given the same reference materials as in the earlier description. In that embodiment, a turbine 61 drives a generator 63 that applies signal segments to switching means 3. A rectifying means 107 receives the signal segments selectively transmitted by switching means 3 under the direction of a control means 111. Polarity means 5 receives the transmitted and rectified signal segments for establishing the polarity of the output signal which is passed to a filtering means 109 to remove undesired frequency components before application to a load 113.

The embodiment of FIG. 8 includes a more complex control means 111 than formerly described. Control means 111 includes a sensor means 115 sampling the output signal for frequency, amplitude and/or other characteristics. The parameter sensing means 115 are delivered to control means 111 for adjustment, if necessary, of the control signals supplied to polarity means 5 and/or switching means 3 to restore the frequency, amplitude or other sensed output signal parameters to the desired values. Control means 111 also includes a field control means 117 for controlling the current flowing through the field winding of generator 61. (An example of such a field winding appears in FIG. 2 as electromagnet 31.) Control means 111 samples a signal segment from the generator and passes the sensed parameters, such as amplitude, to control means 111 through field control means 117. Under the influence of control means 111, field control 117 adjusts the field winding current to restore, if necessary, the sensed segment parameters to the desired values.

Figure 9A:
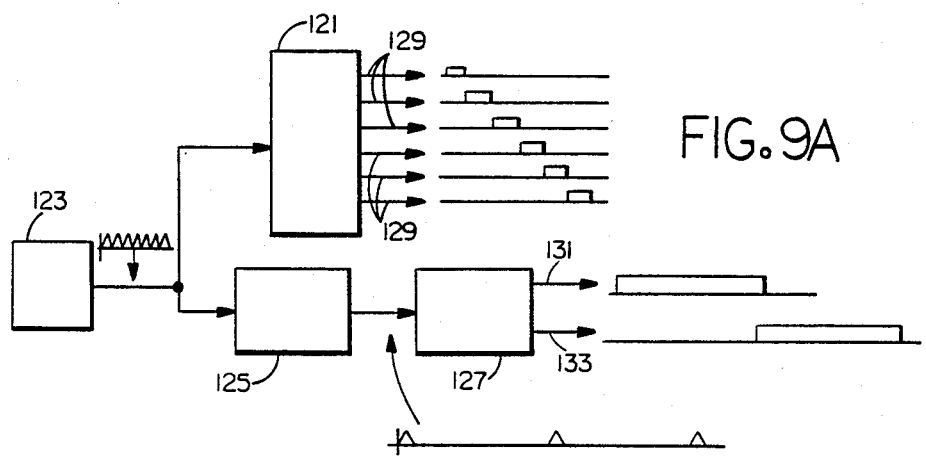
FIG. 9A, 9B and 9C are more detailed block diagrams oF preferred embodiments of control means according to the invention.
Figure 9B:
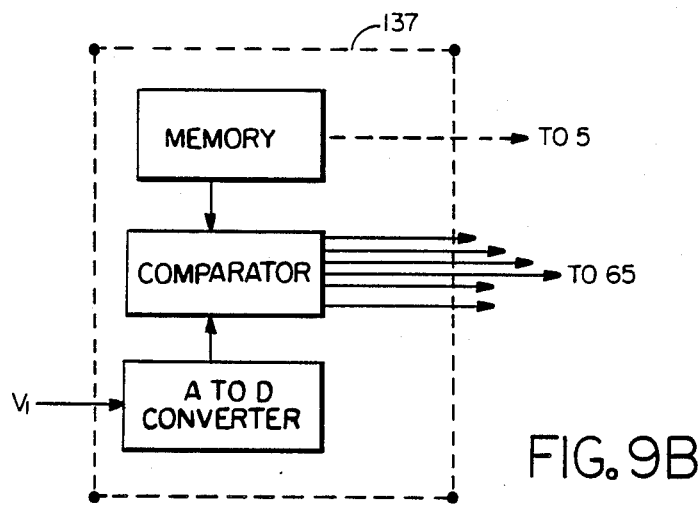
Figure 9C:
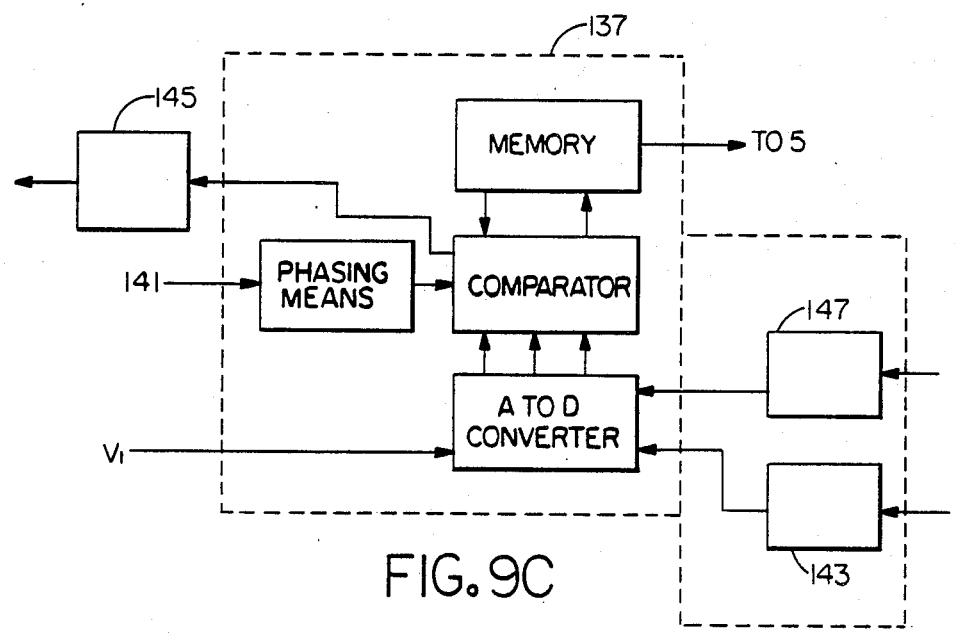

Clearly, the control means in the various preferred embodiments of the invention described is an important element. A number of different, alternative preferred embodiments of control means are illustrated in FIGS. 9A, 9B, and 9C. A simple type of control means usable with the apparatus of FIG. 5 is shown in FIG. 9A as a counter 121 driven by a clock 123. A second counter 125 driven by clock 123 feeds a flip flop circuit 127 that forms a portion of polarity means 5. Counter 121 has a plurality of output terminals 129, equal in number to the number of different signal segments from dividing means 1. One of terminals 129 is connected to a gate of each of switches 65. After the preselected number of clock pulses are received by counter 121, one of terminals 129 receives a high signal switching "on" the one of switches 65 to which terminal 129 is connected. After a preselected number of additional clock pulses, that terminal 129 returns to its low state, opening the switch to which it is connected, another of terminals 129 goes high and another of switches 65 is closed. This process continually repeats through a fixed switching sequence to transmit the input signal segments in preselected manner and produce the desired output waveform. This control means embodiment is effective only when a constant relationship exists between the input and desired output signal waveforms and no adjustments are needed during operation to compensate for changing input signal parameters.

Flip flop circuit 127 has two terminals 131 and 133 that have complementary output signals. That is, one of terminals 131 and 133 has a high signal and the other a low signal. Terminals 131 and 133 are connected to polarity means 5, such as to switches 75A through 75D. For a sinusoidal output signal, flip flop 127 is driven by counter 125 and the states of the signals at terminals 131 and 133 are changed at the zero-crossing points, i.e. at each half cycle, of the desired output signal to change its polarity as previously explained.

Another, more flexible embodiment of a control means is shown in FIG. 9B. A microprocessor 137 includes a memory and digital processing capacity. Microprocessor 137 has stored in its memory in digital form the amplitude versus time waveform of the desired output signal. The stored signal automatically incorporates frequency information. At least one of the input signal segments is sampled periodically by microprocessor 137 which digitizes the sampled amplitude. The digitized value is compared with the stored value of the desired output signal for the time portion involved and a gate signal for one of switches 65 is generated in response to the comparison. Since the amplitudes of the signal segments bear a constant relation to each other, it is only necessary to sample one of them. The process is repeated over and over through time periods that are each much shorter than the period of the input signal. Again, the polarity means may be driven by a flip flop circuit or an additional control signal, a polarity control signal, may be generated by microprocessor 137. This embodiment of a control means is particularly useful since it is relatively immune to frequency and amplitude changes in the input signal. The comparisons and decisions of which of switches 65 close made in real time based on a stored, unvarying reference signal. Changes in input signal parameters merely result in a change of sequence of switching and/or of the selection of switches 65 that are actuated during a cycle of the output signal.

As described above, in some embodiments only a single polarity of amplitude is transmitted or is transmitted during each half cycle of the output signal. In this embodiment, described in relation to FIG. 7, microprocessor 137 incorporates the polarity means by making an additional comparison of the polarities of the reference and input signal amplitudes in the course of deciding which switches 65, if any, to close. Where amplitude polarity is irrelevant, as mentioned with reference to the embodiment of FIG. 5, this additional digital processing step is omitted.

The flexibility of microprocessor 137 allows even greater sophistication in controlling the characteristics of the output signal. As shown in FIG. 9C, microprocessor 137 may receive a reference signal 141, such as the signal from the main power lines, to establish a particular reference phase. Microprocessor 137 can then adjust the timing of the control signals to switching means 3 and to polarity means 5 by adjusting the time scale of the reference output signal stored in the memory. In this way a constant phase relationship may be established with the phase reference signal. Maintaining this fixed phase relationship is important in some applications such as supplying excess generated power to the main power lines. It is also useful to be able to maintain the phase relationship when the invention is being used to generate polyphase output signals of preselected waveforms, as already mentioned.

Additional control of the amplitude of the output signal can be exercised where a generator having a field winding supplies the input signal. A sensor 143 sensing the amplitude of the output signal feeds its sensed signal to microprocessor 137. The microprocessor compares the sensed amplitude signal to a stored amplitude reference signal and, if necessary, commands a field control 145 to adjust the current flowing through the field winding of the generato supplying the input signal in order to change the amplitude of the generated input signal. The field current may be adjusted in numerous ways. For example, field control means 145 may include a pulse width modulator that modulates a current pulse train supplied to the generator's field winding. By widening or narrowing the width of pulses of field current, the average magnetic field in the generator may be increased or decreased. The generator may include a permanent magnet for generating an induction field and the field produced by the field winding may enhance or trim the permanent magnet field intensity to produce the desired amplitude of the output signal. For example, electromagnets 31 of FIG. 2 may trim the magnetic field generated by permanent magnets 25. This kind of compensation permits the apparatus to produce a substantially constant output voltage over a wide range of load conditions.

A frequency sensor 147 may sample the frequency of the output signal and deliver the sensed signal to microprocessor 137. An adjustment in the polarity means control signals or in the amplitude reference signal can be made, if necessary, in response to the sensed frequency to restore the desired output signal frequency. While this frequency control is useful, the inherent stability of the microprocessor memory and reliability of the frequency information stored, make it unlikely that the frequency sensor would be used often.

The invention has been described with reference to certain preferred embodiments. Various additions and modifications within the spirit of the invention will occur to those of skill in the art. Therefore, the scope of the invention is limited solely by the following claims.

I claim:

1. Apparatus for deriving an alternating current electrical output signal having a preselected waveform and frequency from a variable, higher frequency alternating current electrical input signal, said apparatus comprising:
   input terminals for receiving an input signal and output terminals for connection to an electrical load;
   dividing means connected to said input terminals for receiving and dividing an alternating current input signal having a first frequency into a plurality of continuous input signal segments, each segment having a different amplitude, said dividing means comprising a mechanically driven alternating current generator including a winding for extracting said input signal from said generator, said winding having first and second ends, and a plurality of individual electrical connections to said winding intermediate said first and second ends for extracting sasid input signal segments from said generator;
   switching means receiving said input signal segments from said dividing means for selectively transmitting to said output terminals different ones of said input signal segments; and
   control means connected to said switching means for controlling over time the selective transmission by said switching means of said input signal segments to produce at said output terminals an alternating current output signal having a preselected waveform of a second frequency lower than said first frequency.

2. The apparatus of claim 1, said switching means comprising a plurality of controllable switches, wherein one of said controllable switches receives each of said input signal segments.

3. The apparatus of claim 2, each of said controllable switches comprising a bilateral, gate-controlled switch.

4. The apparatus of claim 2, said control means comprising counting means for geneating control signals to open and close said controllable switches.

5. The apparatus of claim 2, said control means including signal replicating means for replicating the amplitude over time of said preselected waveform of the output signal, comparator means receiving said replicated signal and said input signal segments for comparison of their respective amplitudes and generating control signals for switching said controllable switches in response to said comparison.

6. The apparatus of claim 5, said control means comprising a microprocessor including converting means for converting the amplitudes of said signal segments to digital form, said replicating means comprising memory means for storing the amplitude over time of said preselected waveform in digital form, said comparator means comprising means for comparison of the digital amplitudes of said preselected output signal waveform and said signal segments, wherein said control means generates a control signal to transmit the signal segment having the amplitude closest to that of said preselected waveform.

7. The apparatus of claim 1, said control means including phasing means for establishing a preselected phase difference between said output signal and a reference signal.

8. The apparatus of claim 1, said control means including sensing means for sensing the polarity of said selectively transmitted input signal segments and polarity means for controlling the polarity of said output signal over time in response to the sensed polarity of said transmitted input signal segments.

9. The apparatus of claim 1 including rectifying means receiving said selectively transmitted input signal segments from said switching means for rectifying said selectively transmitted input signal segments to produce rectified signals and polarity means connected to said control means and receiving said rectified signals for selectively connecting, under the control of said control means, said rectified signals to different ones of said output terminals to produce the polarity over time of said preselected waveform.

10. The apparatus of claim 9, said rectifying means comprising at least two separate rectifying circuits.

11. The apparatus of claim 10 wherein each of said rectifying circuits comprises a full wave rectifier.

12. The apparatus of claim 9, said polarity means comprising a plurality of controllable switches, wherein each of said switches is connected to one of said output terminals of said apparatus.

13. The apparatus of claim 12, each of said controllable switches comprising a bilateral, gate-controlled switch.

14. The apparatus of claim 12, said control means including flip flop circuit means connected to said polarity means for switching said controllable switches of said polarity means.

15. The apparatus of claim 12, said control means comprising a microprocessor for generating control signals to open and close said controllable switches of said polarity means.

16. The apparatus of claim 1 including filter means connected to said output terminals for filtering undesired signal components from said output signal having a preselected waveform.

17. The apparatus of claim 1, said control means including sensing means for sensing the frequency of said output signal and means responsive to said sensed frequency for controlling said switching means to produce an output signal having a substantially constant frequency.

18. The apparatus of claim 1, said control means including sensing means for sensing the amplitude of said output signal and means responsive to said sensed amplitude for controlling said switching means to produce an output signal having a substantially constant amplitude.

19. An electrical circuit for deriving an alternating current electrical output signal having a preselected waveform and frequency from differing amplitude, same-frequency segments of a variable, higher frequency alternating current input signal, said circuit comprising:
  input terminals for receiving differing amplitude, same-frequency input signal segments of a first frequency and output terminals for connection to an electrical load;
  switching means connected to said input terminals for receiving said input signal segments and for selectively transmitting to said output terminals different ones of said input signal segments, said switching means comprising a plurality of bilateral, gate-controlled switches, one of said switches receiving each of said input signal segments; and
  control means connected to said switching means for controlling over time the selective transmission by said switching means of said input signal segments to produce at said output terminals an alternating current ouput signal having a preselected waveform of a second frequency lower than said first frequency.

20. The apparatus of claim 19, said control means comprising counting means for generating control signals to open and close said controllable switches.

21. The apparatus of claim 19, said control means including signal replicating means for replicating the amplitude over time of said preselected waveform of the output signal, comparator means receiving said replicated signal and said input signal segments for comparison of their respective amplitudes and generating control signals for switching said controllable switches in response to said comparison.

22. The apparatus of claim 21, said control means comprising a microprocessor including converting means for converting the amplitudes of said signal segments to digital form, said replicating means comprising memory means for storing the amplitude over time of said preselected waveform in digital form, said comparator means comprising means for comparison of the digital amplitudes of said preselected waveform and said signal segments and wherein said control means generates a control signal to transmit the signal segment having the amplitude closest to said that of said preselected waveform.

23. The apparatus of claim 19, said control means including phasing means for establishing a preselected phase difference between said output signal and a reference signal.

24. The apparatus of claim 19, said control means including sensing means for sensing the polarity of said selectively transmitted input signal segments and polarity means for controlling said polarity of said output signal over time in response to the sensed polarity of said transmitted input signal segments.

25. The apparatus of claim 19 including rectifying means receiving said selectively transmitted input signal segments from said switching means for rectifying said selectively transmitted input signal segments to produce rectified signals and polarity means connected to said control means and receiving said rectified signals for selectively connecting, under the control of said control means, said rectified signals to different ones of said output terminals to produce the polarity over time of said preselected waveform.

26. The apparatus of claim 25, said rectifying means comprising at least two separate rectifying circuits.

27. The apparatus of claim 26 wherein each of said rectifying circuits comprises a full wave rectifier.

28. The apparatus of claim 25, said polarity means comprising a plurality of controllable switches, wherein each of said switches is connected to one of said output terminals of said apparatus.

29. The apparatus of claim 28, each of said controllable switches comprising a bilateral, gate-controlled switch.

30. The apparatus of claim 28, said control means including flip flop circuit means connected to said polarity means for switching said controllable switches of said polarity means.

31. The apparatus of claim 28, said control means comprising a microprocessor for generating control signals to open and close said controllable switches of said polarity means.

32. The apparatus of claim 19 including filter means connected to said output terminals for filtering undesired signal components from said output signal having a preselected waveform.

33. The apparatus of claim 19, said control means including sensing means for sensing the frequency of said output signal and means responsive to said sensed frequency for controlling said switching means to produce an output signal having a substantially constant frequency.

34. The apparatus of claim 19, said control means including sensing means for sensing the amplitude of said output signal and means responsive to said sensed amplitude for controlling said switching means to produce an output signal having a substantially constant amplitude.

* * * * *